United States Patent
Malka et al.

(10) Patent No.: US 9,041,796 B2
(45) Date of Patent: May 26, 2015

(54) METHOD, TOOL, AND DEVICE FOR DETERMINING THE COORDINATES OF POINTS ON A SURFACE BY MEANS OF AN ACCELEROMETER AND A CAMERA

(76) Inventors: Francis Ruben Malka, St-Lambert (CA); Gilles Jean Desforges, St-Lambert (CA)

(*) Notice: Subject to any disclaimer, the term of this patent is extended or adjusted under 35 U.S.C. 154(b) by 674 days.

(21) Appl. No.: 12/848,204

(22) Filed: Aug. 1, 2010

(65) Prior Publication Data

US 2012/0026322 A1 Feb. 2, 2012

(51) Int. Cl.
*H04N 7/18* (2006.01)
*G01C 11/02* (2006.01)

(52) U.S. Cl.
CPC .................................... *G01C 11/02* (2013.01)

(58) Field of Classification Search
USPC ............... 348/113, 135, 139, 142, 152, 187; 348/207.1, 207.99; 356/3.1, 141.5, 147, 356/601, 614; 382/106
See application file for complete search history.

(56) References Cited

U.S. PATENT DOCUMENTS

| | | | | |
|---|---|---|---|---|
| 5,784,282 A * | 7/1998 | Abitbol et al. | ................. | 700/186 |
| 6,181,302 B1 * | 1/2001 | Lynde | ................. | 345/7 |
| 6,266,628 B1 | 7/2001 | Huep et al. | | |
| 6,731,329 B1 * | 5/2004 | Feist et al. | ................. | 348/135 |
| 6,853,909 B2 * | 2/2005 | Scherzinger | ................. | 701/472 |
| 7,086,164 B2 | 8/2006 | Satoh et al. | | |
| 7,141,772 B2 * | 11/2006 | Jung et al. | ................. | 250/203.4 |
| 7,210,235 B2 * | 5/2007 | Sato | ................. | 33/355 R |
| 7,218,384 B2 | 5/2007 | Shirai et al. | | |
| 7,375,801 B1 * | 5/2008 | Briscoe et al. | ................. | 356/3.1 |
| 7,477,295 B2 * | 1/2009 | Tanaka | ................. | 348/231.3 |
| 7,526,384 B2 * | 4/2009 | MacIntosh et al. | ................. | 702/5 |
| 7,541,974 B2 * | 6/2009 | Scherzinger | ................. | 342/357.32 |
| 7,568,289 B2 * | 8/2009 | Burlingham et al. | ................. | 33/284 |
| 7,583,391 B2 * | 9/2009 | Lu | ................. | 356/601 |
| 7,623,224 B2 * | 11/2009 | Vogel | ................. | 356/141.5 |
| 7,633,610 B2 | 12/2009 | Walser | | |
| 7,706,573 B1 | 4/2010 | Motamedi et al. | | |
| 2006/0201006 A1 * | 9/2006 | Burlingham et al. | ................. | 33/284 |
| 2006/0221187 A1 * | 10/2006 | Alhadef | ................. | 348/207.1 |
| 2007/0088497 A1 * | 4/2007 | Jung | ................. | 701/207 |
| 2007/0211143 A1 * | 9/2007 | Brodie et al. | ................. | 348/141 |
| 2009/0021580 A1 * | 1/2009 | Ishigami et al. | ................. | 348/142 |
| 2009/0096884 A1 * | 4/2009 | Schultz et al. | ................. | 348/222.1 |
| 2010/0058399 A1 * | 3/2010 | Shen et al. | ................. | 725/72 |
| 2010/0128121 A1 * | 5/2010 | Wilkinson | ................. | 348/135 |
| 2010/0141759 A1 * | 6/2010 | Scherzinger | ................. | 348/139 |
| 2010/0141775 A1 * | 6/2010 | Vogel | ................. | 348/187 |
| 2010/0188504 A1 * | 7/2010 | Dimsdale et al. | ................. | 348/142 |
| 2011/0109747 A1 * | 5/2011 | Forrester et al. | ................. | 348/152 |

FOREIGN PATENT DOCUMENTS

| | | | | | |
|---|---|---|---|---|---|
| JP | 04136974 A | * | 5/1992 | ............... | G09B 9/00 |
| JP | 2009105802 A | * | 5/2009 | | |

* cited by examiner

*Primary Examiner* — Dave Czekaj
*Assistant Examiner* — Shanika Brumfield

(57) ABSTRACT

A method, tool, and device for determining the coordinates or a plurality of points on a substantially plane surface by means of an accelerometer and a camera. The coordinates of each point are computed by determining a perpendicular projection of the camera onto the surface, identifying each point, measuring an inclination (the angle between the line of sight of the camera and gravity) using the accelerometer, and determining an azimuth (the angle of the line of sight of the camera around gravity).

15 Claims, 4 Drawing Sheets

METHOD, TOOL, AND DEVICE FOR DETERMINING THE COORDINATES OF POINTS ON A SURFACE BY MEANS OF AN ACCELEROMETER AND A CAMERA

BACKGROUND OF THE INVENTION

Terminology in this description is defined as follows:

Azimuth: The angle of the line of sight of the camera around gravity.

Inclination: The angle between the line of sight of the camera and gravity.

Augmented reality: Live view of a physical, real-world environment whose elements are augmented by computer-generated sensory input. Artificial information about the environment and its objects can be overlaid on the real world.

Substantially plane: Said of a surface on which a line joining any two points is never more than 10% of its length apart from the surface. Users with greater precision requirements may require a lower percentage of deviation, while users having lower precision requirements may allow more deviation.

FIELD OF THE INVENTION

The present invention relates in general to the measurement of spatial coordinates using a device.

DESCRIPTION OF THE PRIOR ART

Over the last centuries, man has invented many techniques and devices for determining coordinates of points.

When surveying terrestrial points over large distances, the theodolite is the most widely used device. Theodolites are stationary devices, capable of rotating both horizontally and vertically, mounted on a tripod. Angles are measured by reading graduated circles around both axes through a magnifying glass. To be accurate, such devices must be leveled with great precision prior to use. While early theodolite embodiments relied essentially on optical and mechanical components, modern versions are capable of measuring distances electro-optically. Angle readouts are now performed by a rotary encoder, either absolutely using gray codes, or relatively using equidistant light and dark radial bands. Point coordinates are determined using triangulation, by measuring the azimuth and altitude of a target point from two observation points of known location and altitude.

When measuring dimensions indoors or on a smaller scale, the most widely used device is still the tape measure, which is a flexible form of ruler. The modern spring tape was patented by Connecticut resident Alvin J Fellow on 14 Jul. 1868.

Laser rangefinders are now widely used to determine the distance to an object. Such devices send a laser pulse in a narrow beam towards the object and measure the time taken by the pulse to be reflected off the target and returned to the device. The high speed of light makes this technique inadequate for high precision measurements, where triangulation is preferred.

3D laser scanners use a laser and a camera combined with triangulation to probe their environment. They emit a ray of light onto the target surface and look for the location of the laser dot using a camera. The laser appears in different locations depending on how far away the laser strikes the surface.

GPS (Global Positioning System) receivers are also capable of determining the latitude, longitude, and altitude of points on or near the surface of the earth. The GPS receiver must be placed precisely on the point to measure, and must have a clear line of sight to four or more satellites.

LIDAR (LIght Detection And Ranging) is an optical remote sensing technology capable of finding the range to a distant target by measuring properties of scattered light on its surface. LIDAR devices cast a narrow light beam of short wavelength that can interact with a wide range of surfaces with great precision.

SUMMARY OF THE INVENTION

In an aspect of the invention, there is provided a method of determining the coordinates of a plurality of points on a substantially plane surface S by means of a device comprising an accelerometer and a camera. In specific embodiments, the method may also require that the device comprise an input unit, a gyroscope, a compass, a processor, or a screen. For each point $P_i$, the method determines a perpendicular projection $C_i$ of the location of the camera onto S, identifies the point $P_i$ by means of the device, measures an inclination $I_i$ by means of the accelerometer, determines an azimuth $A_i$, and finally computes the coordinates of the point $P_i$ using the azimuth $A_i$, the inclination and the perpendicular projection $C_i$ by means of the processor.

In another aspect of the invention, a device for determining the coordinates of a plurality of points on a substantially plane surface S is provided. The device comprises a camera for capturing a video stream, a screen for displaying the video stream, an accelerometer for measuring an inclination $I_i$ for each point $P_i$, a point determination unit for identifying each point $P_i$, reading the inclination $I_i$ from the accelerometer for each point $P_i$, and determining an azimuth $A_i$ for each point $P_i$, and a coordinates computation unit for determining a perpendicular projection $C_i$ of the location of the camera onto S and computing the coordinates of each point $P_i$ using $A_i$, $I_i$, and $C_i$. In specific embodiments, the device may also comprise an input unit, a gyroscope or a compass.

In another aspect of the invention, a tool for determining the coordinates of a plurality of points on a substantially plane surface S, adapted to run on a device comprising an accelerometer and a camera, is provided. The tool comprises a point determination unit being adapted for receiving a video stream by means of the camera, reading the inclination $I_i$ from the accelerometer for each point $P_i$, and determining an azimuth $A_i$ for each point $P_i$, and a coordinates computation unit being adapted for computing the coordinates of each point $P_i$ using $A_i$, $I_i$. In specific embodiments, the tool may also be adapted to run on a device comprising an input unit, a gyroscope or a compass.

DESCRIPTION OF THE PREFERRED EMBODIMENTS

Figure 1:
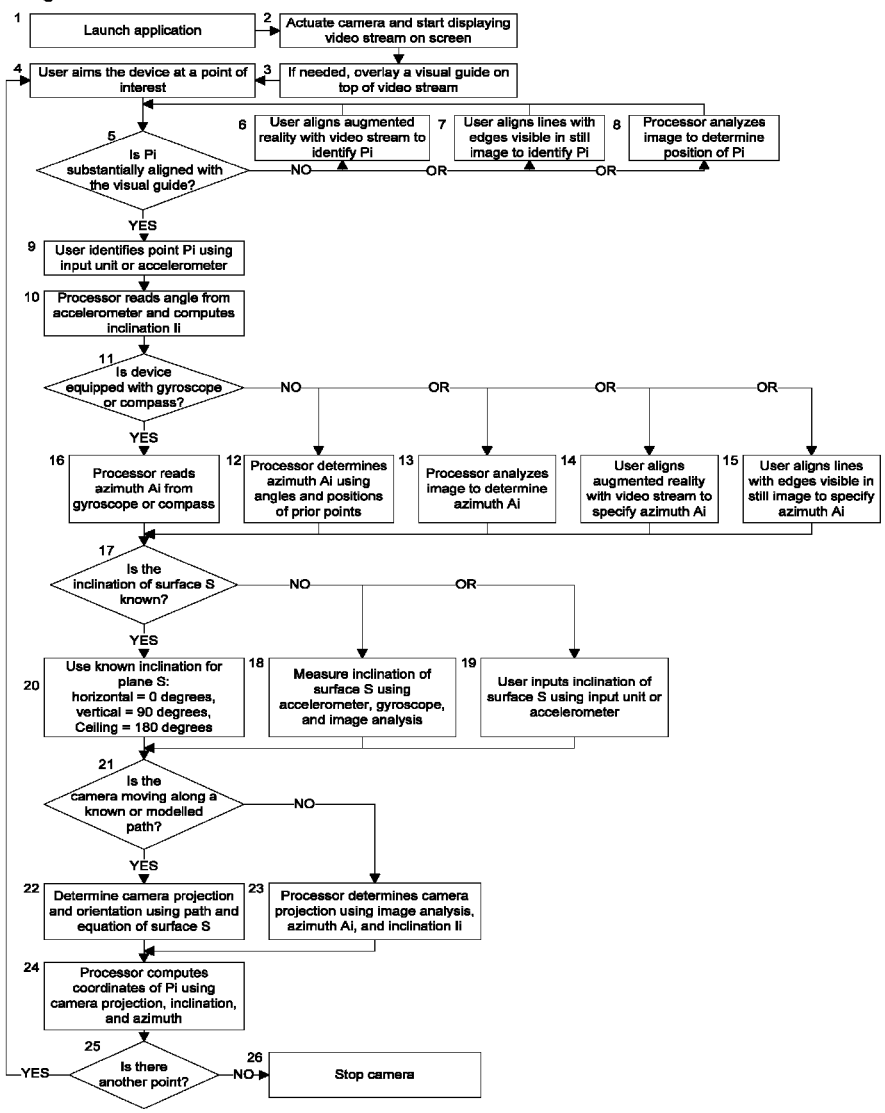
FIG. 1 is an example of a simplified flow chart representing the various steps of the method.

Reference is now made to FIG. 1, wherein there is shown an example of a simplified flow diagram describing the various steps of the method. It is understood that the steps can be performed in any order as long as identifying point $P_i$ 4-9, reading the accelerometer 10, determining the azimuth 11-16, determining the angle between surface S and a horizontal plane 17-20, and determining the projection of the camera onto surface S 21-23 are all performed before computing the point coordinates 25.

According to one of the preferred embodiments of the invention, the user first launches an application 1 and actuates the camera 2 before aiming at the first point of interest. The user stops the camera 26 once the position of the last point has been specified.

According to one of the preferred embodiments of the invention, the user specifies the position of point $P_i$ by aligning an augmented reality drawing 3 with a continuous video stream coming from the camera 6. The augmented reality may represent points on surface S, boundaries of S, lines parallel or perpendicular to S, or any drawing that may help the user to determine the position of point $P_i$. The user may perform the alignment by inclining the device while the processor reads the accelerometer, by manually entering information by means of the input device, or by any other means of communicating information to the device.

According to another preferred embodiment of the invention, the user specifies the position of point $P_i$ by aligning points or lines with edges or features present in a still image or a frame of a video stream of point $P_i$ taken by the camera 7. The user may perform the alignment by inclining the device while the processor reads the accelerometer, by manually entering information by means of the input device, or by any other means of communicating information to the device.

According to another preferred embodiment of the invention, the processor determines the position of point $P_i$ by analysing a still image or a frame of a video stream of point $P_i$ taken by the camera 8. Such image analysis may include performing edge detection to extract contour lines, computing the location of vanishing points using edges, ranking edges according to their length, their proximity to the reticle, their relative angle, or using any feature present in the image to locate point $P_i$. Such image analysis can also be combined in any order with step 6 or 7 to help the user specify the position of $P_i$.

According to another preferred embodiment of the invention, the user identifies point $P_i$ 5 by aligning an object of interest present in the video stream with a visual guide. The user then identifies the point by entering information by means of the input unit.

According to another preferred embodiment of the invention, the user identifies point $P_i$ 9 by holding the device still for a certain period of time while aiming at $P_i$. Movements of the device are measured by means of accelerometers and/or gyroscopes. The device is considered to be still if values obtained by means of one or more sensors remain within a bound range for a predetermined period of time.

According to another preferred embodiment of the invention, the processor modifies the values read from the accelerometer 10 before computing the inclination $I_i$. Such modification may comprise smoothing the values over a period of time, computing the mean of multiple values, combining readings from multiple accelerometers in order to maintain precision in all directions, or performing any computation that would improve the quality of the values.

According to another preferred embodiment of the invention, the device is equipped with a gyroscope having at least one axis 16. The processor determines the angle of the device around gravity $A_i$ by means of the vertical axis of the gyroscope. Additional axes can provide further precision by measuring the inclination of the device around horizontal axes as well, allowing measurements of the gyroscope to be combined with those of the accelerometer for increased stability and precision. It should be noted that a gyroscope only measures relative angles, so all azimuths are measured relatively to that of $P_0$.

According to another preferred embodiment of the invention, the device is equipped with a compass 16. The processor determines the azimuth $A_i$ using the magnetic field of the Earth by means of the compass. Absolute azimuths can be obtained based on the direction of the geographic or magnetic north.

According to another preferred embodiment of the invention, the processor determines azimuth $A_i$ using positions and angles of prior points 12. Since angles $B_i$ formed by points $[P_{i-2}, P_{i-1}, P_i]$ are known for all points $P_i$, their azimuth can be deduced by knowing the distance between $P_i$ and the camera projection $C_i$. A simple example is the case where all angles $B_i$ are square. We then conveniently place $P_1$ and $P_2$ lie along the x axis. There must be a distance u that satisfies:

$$P_2 \cdot x = P_1 \cdot x + u$$
$$P_2 \cdot y = P_1 \cdot y \qquad (i)$$

Knowing the distance between the camera and $P_2$ and using the projection of the camera $C_2$, we deduce distance r between $P_2$ and the origin:

$$P_1 \cdot x^2 + P_2 \cdot y^2 = r^2 \qquad (ii)$$

Combining (i) and (ii), we obtain a second order equation:

$$u^2 + (2 \times P_1 \cdot x)u + (P_1 \cdot x^2 P_1 \cdot y^2 - r^2) = 0$$

Solving for u yields two solutions for azimuth $P_2$.
Using $P_2$, we then deduce $A_2$:
if $$P_2 \cdot x \neq 0, A_2 = \operatorname{asin}(P_2 \cdot y / P_2 \cdot x) \times \operatorname{sign}(y)$$

else $$A_2 = PI/2 \times \operatorname{sign}(P_2 \cdot y)$$

In the more general case where angles $B_i$ are known for all vertices $P_i$, we obtain the azimuth $T_i$ of each segment $[P_i, P_{i+1}]$ as follows:

$$T_0 = 0$$

$$T_{i+1} = T_i + B_i$$

For each $P_i$, there exists a distance u such as:

$$P_{i+1} \cdot x = P_i \cdot x + u \times \cos(T_i)$$
$$P_{i+1} \cdot y = P_i \cdot y + u \times \sin(T_i) \qquad (iii)$$

Combining (ii) and (iii), we obtain an equation containing u. Solving for u yields the coordinates of $P_i$.

According to another preferred embodiment of the invention, the processor analyses a still image or a frame of a video of $P_i$ to determine azimuth $A_i$ 13. Such image analysis may comprise performing edge detection to extract contour lines, computing the location of vanishing points using edges, ranking edges according to their length, their proximity to the reticle, their relative angle, or using any feature present in the image to locate point $P_i$. Combining the information obtained by extracting these features with results of 12, 14, and/or 15, the processor determines azimuth $A_i$.

According to another preferred embodiment of the invention, the inclination of surface with respect to a horizontal plane is input by the user by means of an input unit or an accelerometer 19.

According to another preferred embodiment of the invention, the processor computes the inclination H of surface S with respect to a horizontal plane by means of an accelerometer, a gyroscope, and image analysis 18. Such image analysis may comprise performing edge detection to extract contour lines, computing the location of vanishing points using edges, ranking edges according to their length, their proximity to the reticle, their relative angle, or using any feature present in the image to determine H.

According to another preferred embodiment of the invention, the camera is moving along a known path or along a trajectory represented by a mathematical model 22. In such case, the projection $C_i$ of the camera onto surface S can be obtained by modelling S using the generic equation of a plane:

$$ax+by+cz+d=0$$

The surface normal is represented by the following vector: [a, b, c]

$C_i$ is the perpendicular of $O_i$ on surface S. Hence, there exists a k such as:

$$O_i = C_i + k \times [a,b,c]$$

Isolating $C_i$:

$$C_i = O_i - k \times [a,b,c]$$

Injecting $C_i$ into the plane equation yields k:

$$k = (a \times O_i \cdot x + b \times O_i \cdot y + c \times O_i \cdot z)/(a^2+b^2+c^2)$$

The projection of the camera $C_i$ then becomes:

$$C_i = O_i - (a \times C_i \cdot x + b \times C_i \cdot y + c \times C_i \cdot z)/(a^2+b^2+c^2) \times [a,b,c]$$

According to another preferred embodiment of the invention, the movement of the camera is approximated using a biomechanical model of the user holding the device 19. Such computation may take into account the total height of the user, the height of his eyes, their focal distance, the length of his arms and forearms, and the angle of his shoulders and elbows.

According to another preferred embodiment of the invention, the position of the camera is determined using image analysis, azimuth $A_i$, and Inclination $I_i$ 23. Such image analysis may comprise performing edge detection to extract contour lines, computing the location of vanishing points using edges, ranking edges according to their length, their proximity to the reticle, their relative angle, or using any feature present in the image to locate the camera projection $C_i$ onto surface S using point $P_i$.

According to another preferred embodiment of the invention, the processor computes the coordinates of point $P_i$ using inclination $I_i$ and azimuth $A_i$ 24. The distance d between $P_i$ and the camera $O_i$ is computed as follows:

$$d = C_i \cdot z / \tan(I_i)$$

Taking azimuth $A_i$ into account, we obtain:

$$P_i \cdot x = O_i \cdot x + C_i \cdot z / \tan(I_i) \times \cos(A_i)$$

$$P_i \cdot y = O_i \cdot y + C_i \cdot z / \tan(I_i) \times \cos(A_i)$$

Figure 2:
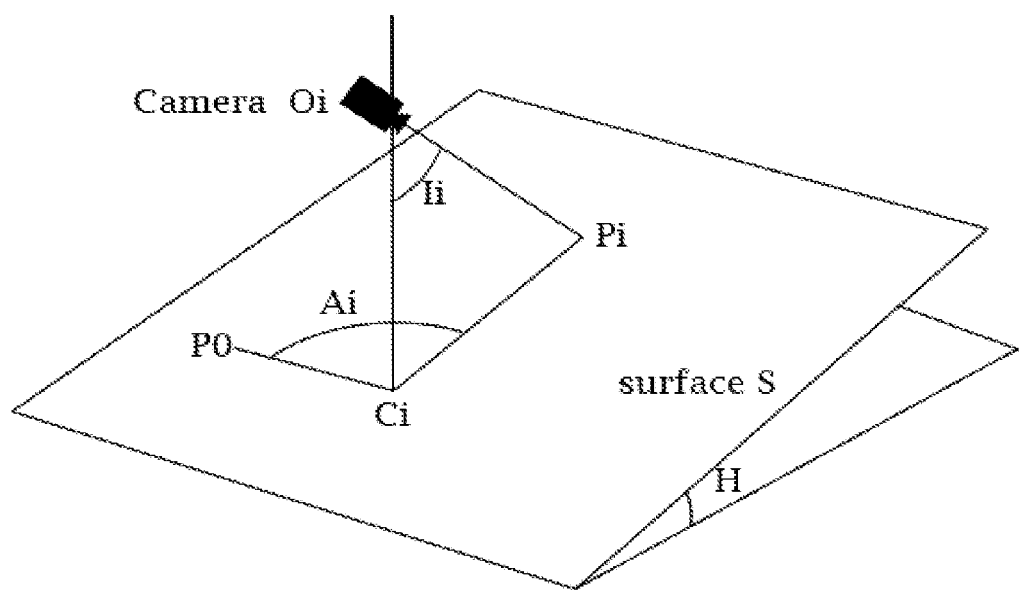
FIG. 2 is an example of a simplified geometric representation of the spatial configuration of the camera $O_i$ relatively to surface S, its projection $C_i$, its inclination $I_i$, its azimuth $A_i$, point $P_i$, and angle H between surface S and a horizontal plane.

Reference is now made to FIG. 2, wherein there is shown an example of a simplified geometric representation of the spatial configuration of the camera $O_i$ relatively to surface S, its projection $C_i$, its inclination $I_i$, its azimuth $A_i$, point $P_i$, and angle H between S and a horizontal plane.

According to one of the preferred embodiments of the invention, surface S can either be the floor, the wall or the ceiling of a room where the user is standing, in which case H would be set to 0 degrees, 90 degrees, or 180 degrees respectively.

According to another preferred embodiment of the invention, the point coordinates are used to create the floor plan of a building.

According to another preferred embodiment of the invention, the point coordinates are used to survey a terrain or a structure.

Figure 3:
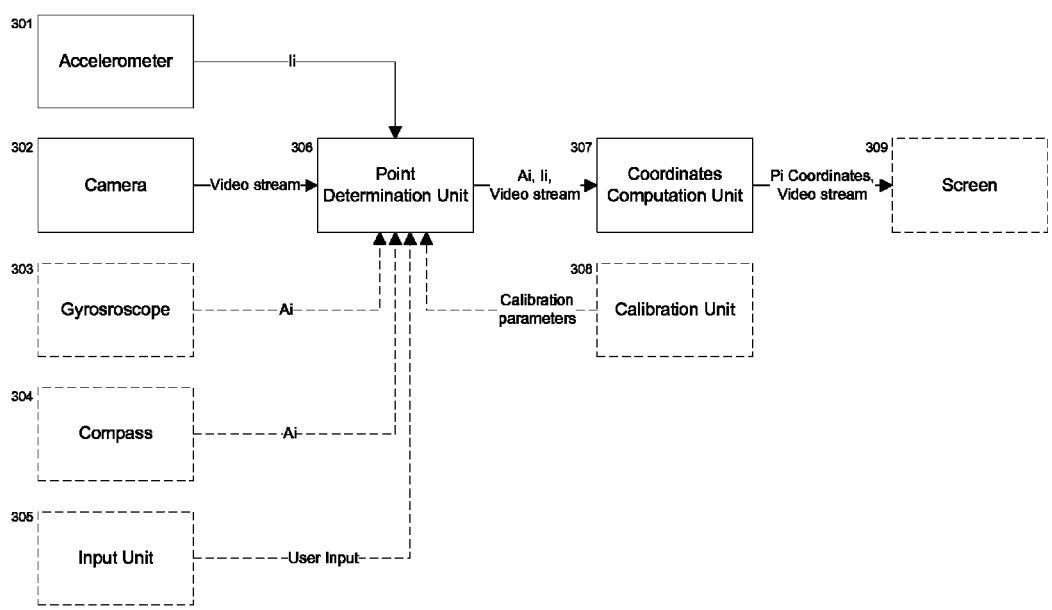
FIG. 3 is an example of a simplified representation of the flow of information inside the device components, namely an accelerometer, a camera, a point determination unit, a coordinates computation unit, and, optionally, a gyroscope, a compass, an input unit, a calibration unit, and a screen.

Reference is now made to FIG. 3, wherein there is shown an example of a simplified representation of the flow of information inside the device components, namely an accelerometer 301, a camera 302, a point determination unit 306, a coordinates computation unit 307, and, optionally, a gyroscope 303, a compass 304, an input unit 305, a calibration unit 308, and a screen 309.

According to one of the preferred embodiments of the invention, the input unit 305 comprises a touch screen allowing the user to input information using one finger, many fingers, or a stylus.

According to another preferred embodiment of the invention, the input unit 305 comprises a microphone coupled with a processor in order to perform voice analysis and command detection.

According to another preferred embodiment of the invention, the input unit 305 comprises a keyboard.

According to another preferred embodiment of the invention, the input unit 305 comprises a pointing device such as a mouse, a trackball, or a joystick.

According to another preferred embodiment of the device, the device is a portable device such as a cellular phone, a smartphone, a PDA (Personal Digital Assistant), a tablet, a digital camera, or a laptop computer.

According to another preferred embodiment of the invention, the screen 309 is displayed on digital glasses worn by the user.

According to another preferred embodiment of the invention, the device comprises a gyroscope 303 having at least one axis. The first axis of the gyroscope is used to read the angle of the device around gravity. Additional axes can provide further precision by measuring the inclination of the device around horizontal axes, allowing measurements of the gyroscope to be combined with those of the accelerometer 301 for increased stability and precision.

Figure 4:
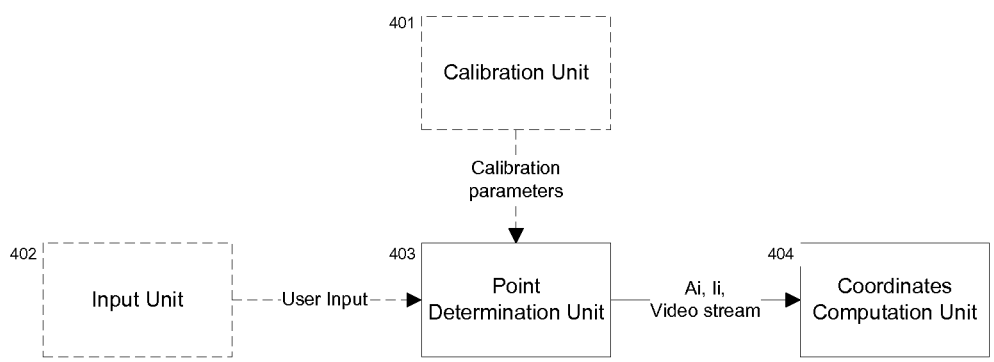
FIG. 4 is an example of a simplified representation of the components of the tool, namely a point determination unit, a coordinates computation unit, and, optionally, an input unit and a calibration unit.

Reference is now made to FIG. 4, wherein there is shown an example of a simplified representation of the components of the tool, namely a point determination unit 403, a coordinates computation unit 404, and, optionally, an input unit 402 and a calibration unit 401.

According to one of the preferred embodiment of the invention, the user calibrates the device by means of the calibration unit 401 to take into account the optical characteristics of the camera, including the focal distance, the speed and accuracy of the autofocus, the aperture, the frame rate, the resolution, the aspect ratio, the color spectrum or any other characteristic susceptible to affect images captured therefrom. These calibration parameters are then used to correct the captured images or to adjust image analysis in order for the results to substantially match reality.

According to another preferred embodiment of the invention, the user calibrates the device by means of the calibration unit 401 to take into account at least one biometric parameter of the user. These parameters may include the total height of the user, the height of his eyes, their focal distance, the length of his arms and forearms, and the angle of his shoulders and elbows, or any measurement that may be used in determining the position $O_i$ and orientation of the camera. These parameters are used to compute the perpendicular projection $C_i$ of the camera onto surface S.

According to another preferred embodiment of the invention, the user calibrates the device by means of the calibration unit 401 to adjust the values measured by the accelerometer. The calibration parameters are used to correct the horizontally or vertically boundaries of the inclination measured by accelerometer, or to distribute the inclination angles evenly across the scale using a mathematical model or a correction table.

According to another preferred embodiment of the invention, the user calibrates the device by means of the calibration unit 401 using reference values. For instance, the device may be calibrated by measuring a known inclination angle by means of the accelerometer or by measuring the known distance between two points $P_o$ and $P_i$.

According to one of the preferred embodiments of the invention, the tool is downloaded onto the device using a cable, a memory card or stick, or a network connection.

According to another preferred embodiment of the invention, the tool is integrated with the device, either as a pre-installed application or an extension of the operating system. The application may be stored in ROM (Read-Only Memory) or implemented using electronic components.

What is claimed is:

1. A method for determining coordinates of a plurality of points $P_i$ on a substantially plane surface S by means of a device comprising an accelerometer, a camera, a screen, and a processor, the method comprising:
   actuating the camera of the device;
   displaying a video stream obtained by the camera on the screen of the device;
   for each point $P_i$:
      displaying by the processor a drawing representing a boundary of the surface S in augmented reality over the video stream on the screen of the device;
      identifying by a user of the device or by the processor of the device the point $P_i$ on the video stream using the augmented reality drawing displayed on the screen of the device;
      determining by the processor of the device a perpendicular projection $C_i$ of a location of the camera of the device onto the surface S, $C_i$ being in a different location than $P_i$;
      reading by the processor of the device an inclination value $I_i$ from the accelerometer of the device;
      computing by the processor of the device a distance $D_i$ between $P_i$ and $C_i$ using the inclination value $I_i$;
      determining by the processor of the device an azimuth $A_i$;
      computing the coordinates of the point $P_i$ using $A_i$, $D_i$, and $C_i$ and using the coordinates to generate a map, such as a floor plan, by means of the processor of the device.

2. The method of claim 1, wherein the azimuth $A_i$ is determined by at least one of the following:
   analyzing an image captured by the camera while aiming at $P_i$;
   receiving a user input from an input unit;
   receiving a value from a gyroscope;
   receiving a value from a compass;
   using a known angle formed by $P_{i-2}$, $P_{i-1}$, and $P_i$; or
   using predetermined values.

3. The method of claim 1, wherein the perpendicular projection $C_i$ is determined by at least one of the following:
   analyzing an image captured by the camera while aiming at $P_i$;
   receiving a user input from an input unit;
   receiving a value from a gyroscope;
   receiving a value from the accelerometer;
   placing the perpendicular projection $C_i$ on a known path;
   rotating the camera around a center of rotation that is substantially the same for all points $P_i$;
   using a biomechanical model of a user holding the device; or
   using predetermined values.

4. The method of claim 1, further comprising a calibration phase determining at least one calibration parameter for at least one of the following:
   correcting the video stream received from the camera by taking into account its optical characteristics;
   determining at least one biometric parameter of a user; or
   adjusting the inclination value $I_i$ received from the accelerometer to an environment in which the device is being used.

5. A device for determining coordinates of a plurality of points $P_i$ on a substantially plane surface S, the device comprising:
   a camera for capturing a video stream;
   a screen for displaying the video stream;
   an accelerometer for measuring an inclination value $I_i$;
   a processor;
   a point determination unit performing for each point $P_i$:
      displaying by the processor a drawing representing a boundary of the surface S in augmented reality over the video stream on the screen of the device;
      identifying by a user of the device or by the processor the point $P_i$ on the video stream using the augmented reality drawing displayed on the screen;
      reading by the processor an inclination value $I_i$ from the accelerometer;
      determining by the processor an azimuth value $A_i$;
   a coordinates computation unit performing for each point $P_i$:
      determining a perpendicular projection $C_i$ of a location of the camera onto the surface S, $C_i$ being in a different location than $P_i$;
      computing by the processor a distance $D_i$ between $P_i$ and $C_i$ using the received inclination value $I_i$;
      computing the coordinates of $P_i$ using $A_i$, $D_i$, and $C_i$ and using the coordinates to generate a map, such as a floor plan.

6. The device of claim 5, further comprising:
   a gyroscope for determining the azimuth value $A_i$ for each point $P_i$.

7. The device of claim 5, further comprising:
   a compass for determining the azimuth value $A_i$ for each point $P_i$.

8. The device of claim 5, wherein the azimuth value A is determined by at least one of the following:
   analyzing an image captured by the camera while aiming at $P_i$;
   capturing a user input by means of an input unit;
   using a known angle formed by $P_{i-2}$, $P_{i-1}$, and $P_i$; or
   using predetermined values.

9. The device of claim 5, wherein the coordinates computation unit determines the perpendicular projection $C_i$ by at least one of the following:
- analyzing an image captured by the camera while aiming at $P_i$;
- capturing a user input by means of an input unit;
- using a gyroscope;
- using the accelerometer;
- placing the perpendicular projection $C_i$ on a known path;
- placing the perpendicular projection $C_i$ such as the lines of sight of the camera for all points $P_i$ intersect at a single point;
- using a biomechanical model of a user holding the device; or
- using predetermined values.

10. The device of claim 5, wherein the point determination unit further performs image analysis on an image for each point $P_i$.

11. The device of claim 5, further comprising a calibration unit for determining at least one calibration parameter for at least one of the following:
- correcting the video stream captured by the camera by taking into account its optical characteristics;
- determining at least one biometric parameter of a user; or
- adjusting the values read from the accelerometer to an environment in which the device is being used.

12. A computer-implementable tool for determining coordinates of a plurality of points $P_i$ on a substantially plane surface S, the tool comprising instructions that can be downloaded electronically or wirelessly to and executed by a device comprising an accelerometer, a screen, a processor and a camera, the tool comprising:
- a point determination unit performing for each point $P_i$:
  - displaying a video stream obtained by the camera on the screen of the device;
  - displaying by the processor a drawing representing a boundary of the surface S in augmented reality over the video stream on the screen of the device;
  - identifying by a user of the device or by the processor of the device the point $P_i$ on the video stream using the augmented reality drawing displayed on the screen of the device;
  - receiving an inclination value from the accelerometer;
  - determining by the processor an azimuth value $A_i$;
- a coordinates computation unit for determining coordinates of each point $P_i$ by:
  - determining a perpendicular projection $C_i$ of a location of the camera onto the surface S, $C_i$ being in a different location than $P_i$;
  - computing by the processor a distance $D_i$ between $P_i$ and $C_i$ on the surface S; and
  - computing the coordinates of $P_i$ using $A_i$; $D_i$, and $C_i$ and using the coordinates to generate a map, such as a floor plan.

13. The tool of claim 12, wherein the point determination unit determines the azimuth value $A_i$ by at least one of the following:
- analyzing an image captured by the camera while aiming at $P_i$;
- displaying the video stream on a screen;
- receiving a user input from an input unit;
- receiving a value from a gyroscope;
- receiving a value from a compass;
- rotating the camera around a center of rotation that is substantially the same for all points $P_i$;
- using a known angle formed by $P_{i-2}$, $P_{i-1}$, and $P_i$; or
- using predetermined values.

14. The tool of claim 12, wherein the coordinates computation unit determines the perpendicular projection $C_i$ by at least one of the following:
- analyzing an image captured by the camera while aiming at $P_i$;
- receiving a user input from an input unit;
- receiving a value from a gyroscope;
- receiving a value from the accelerometer;
- placing the perpendicular projection $C_i$ on a known path;
- placing the perpendicular projection $C_i$ such as the lines of sight of the camera for all points $P_i$ substantially intersect at a single point;
- using a biomechanical model of the user holding the device; or
- using predetermined values.

15. The tool of claim 12, further comprising a calibration unit for determining at least one calibration parameter for at least one of the following:
- correcting the video stream received from the camera by taking into account its optical characteristics;
- determining at least one biometric parameter of a user; or
- adjusting a plurality of values read from the accelerometer to an environment in which the device is being used.

* * * * *